Dec. 12, 1950     D. R. DE BOISBLANC     2,534,005
DETONATION METER

Filed Nov. 19, 1945     2 Sheets-Sheet 1

FIG. I.

INVENTOR.
D. R. DE BOISBLANC
BY Hudson & Young
ATTORNEYS

Dec. 12, 1950         D. R. DE BOISBLANC         2,534,005
                         DETONATION METER
Filed Nov. 19, 1945                              2 Sheets-Sheet 2

INVENTOR.
D. R. DE BOISBLANC
BY Hudson & Young
ATTORNEYS

Patented Dec. 12, 1950

2,534,005

UNITED STATES PATENT OFFICE 2,534,005

DETONATION METER

Deslonde R. de Boisblanc, Bartlesville, Okla., assignor to Phillips Petroleum Company, a corporation of Delaware Application November 19, 1945, Serial No. 629,675

5 Claims. (Cl. 73—35)

This invention relates to detonation meters and methods of measuring detonation. In a more specific aspect it relates to electronic circuit meters for reproducing in a more accurate manner the operation of the ASTM bouncing pin meter.

The ASTM meter of the bouncing pin type is the standard detonation meter for use with relatively slow, low compression, internal combustion engines of the automobile engine type, such as the C. F. R. engine in the F-1 and F-2 methods. The ASTM bouncing pin meter requires a skilled operator and does not give as reliable a measurement of detonation as is desirable.

One object of this invention is to provide an electronic instrument and a method of measuring detonation which will duplicate the rating of fuels by the ASTM bouncing pin meter.

Another object is to provide such an instrument and a method of measuring detonation which will duplicate the rating of fuels by the ASTM method more accurately and with greater sensitiveness than the bouncing pin meter even when operated by an unskilled operator.

Another object of the invention is to provide an instrument which will duplicate functionally the performance in rating of fuels of the ASTM bouncing pin meter, which ASTM bouncing pin meter is a mechanical device having mass and spring constants associated with it that determine its response to accelerations and which, because of the choice of constants in the conventional bouncing pin meter, measures frequencies lying below about 2,000 cycles per second, the instrument embodying the present invention having a low pass filter to allow the passage of voltages from the pick-up the detonation frequencies lying below 2,000 cycles.

In the conventional ASTM bouncing pin meter (not shown) when the device is in proper adjustment the bouncing pin does not leave the diaphragm and does not cause closing of the contacts as long as there is substantially no detonation. On a detonation cycle the rate of change of pressure and consequently the velocity of the diaphragm is higher which causes the pin to leave the diaphragm and close the mechanical contacts. The travel time of the pin is determined entirely by the final velocity given to it, which in turn is related to the peak rate of change of pressure for that detonating cycle.

In the drawings is shown an electronic instrument which does not contain any springs, diaphragm, or bouncing pins, but which nevertheless duplicates in a more accurate and sensitive manner the operation of the ASTM bouncing pin meter of the prior art.

Figure 1:
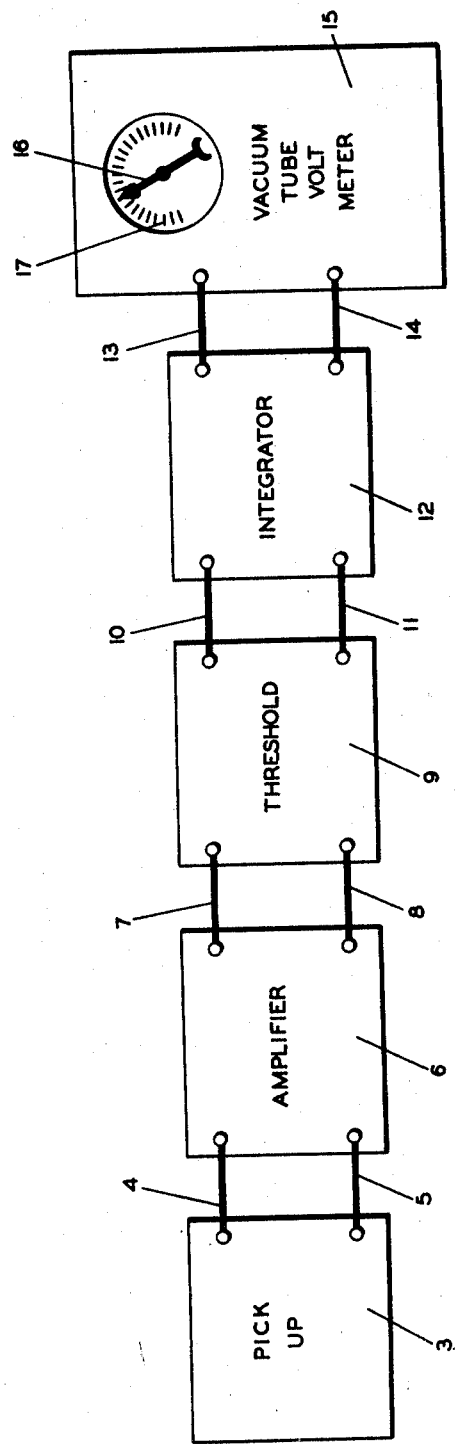
Figure 1 is a diagrammatic view of the elements of an electronic meter embodying the present invention.
Figure 2:
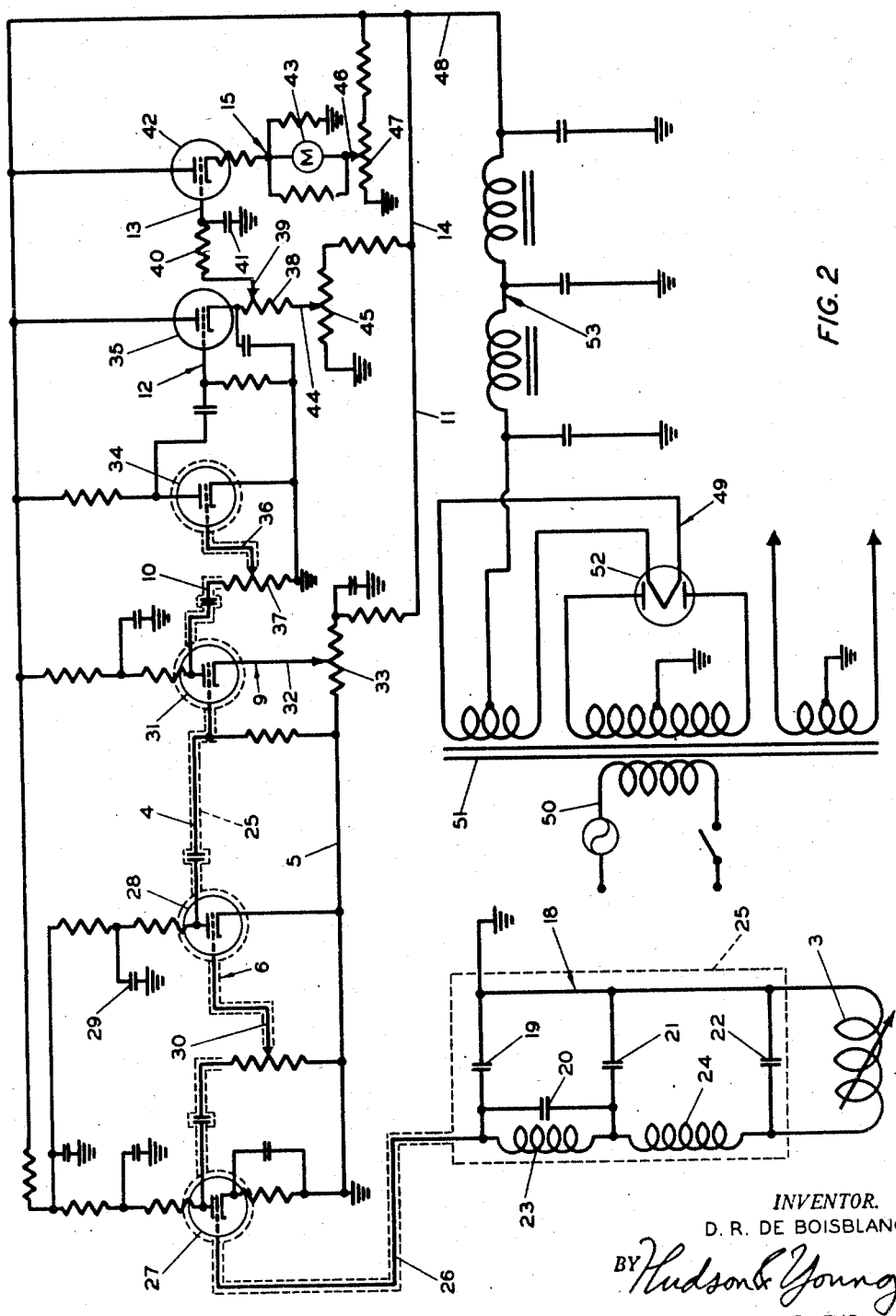
Figure 2 is a suitable wiring diagram for the instrument shown in Figure 1.

While the instrument in Figure 1 is shown as divided into five elements it should be realized that the exact line of demarcation between these elements is indefinite and that the wiring diagram of Figure 2 is a more accurate representation of the embodiment of the invention in an instrument suitable for manufacture and operation.

In Figure 1 a pick-up 3 is shown connected by suitable circuit connections 4 and 5 to amplifier 6 which in turn is connected by circuit connections 7 and 8 to threshold 9 which in turn is connected by circuit connections 10 and 11 to integrator 12 which is finally connected by circuit connections 13 and 14 to a suitable voltage measuring device such as a vacuum tube voltmeter 15 shown in which the intensity of detonation is indicated by pointer 16 and scale 17.

While many different types of pick-ups may be employed for pick-up 3, I have found the Lane Wells Company (Los Angeles, California) pick-up to be a suitable one. This pick-up is a magnetostriction tube pick-up which generally screws into a hole piercing the combustion chamber of the internal combustion engine (not shown). Such a pick-up generates a voltage substantially proportional to the rate of change of pressure in the engine cylinder to which it is connected.

The out-put of pick-up 3 is amplified in amplifier 6 and then all the amplified output of 6 is passed through threshold 9. Threshold 9 is adjustable and can be adjusted to cut out or discard all the elements coming from amplifier 6 below a predetermined adjustable threshold value. All voltages above this predetermined value are amplified, rectified and integrated in integrator 12 and applied to the voltage measuring means 15. I could employ a number of voltage measuring means known to the art, but I prefer to employ a vacuum tube voltmeter for greater accuracy and sensitivity.

In Figure 2, pick-up 3 is indicated diagrammatically.

As the ASTM bouncing pin meter which it is desired to duplicate is responsive to frequencies from approximately 2000 cycles to lower values, it is desirable to filter out all higher frequencies by a low pass filter, generally designated as 18, which may comprise condensers 19, 20, 21 and 22 and inductances 23 and 24. The choice of this type of filter is a compromise to obtain the optimum discrimination between valve clatter noises caused by the valves of the internal combustion engine (not shown) being tested and the signal which it is desired to indicate. Any engineer skilled in the art of electrical engineering can determine the proper type filter to employ by studying a rate diagram of the output of pick-up 3.

Various parts of the instrument in Figure 2 are shown shielded by shield indicated by dotted lines 25. However, in many instances such shield is unnecessary. But I prefer to employ shield 25 as shown in order to obtain better results.

The output of filter 18 is transmitted by suitable circuit element 26 and placed on the grid of triode 27.

The circuit elements including triode 27 and triode 28 are portions of the amplifier 6 of Figure 1. As such amplifiers are common it is not believed necessary to explain such elements as decoupling condenser 29. Amplifier 6 may be provided with a gain control 30. As shown in Figure 1, the output of amplifier 6 passes over circuit elements 4 and 5 to the threshold generally designated as 9. Threshold 9 comprises triode 31 and related elements and the threshold is adjusted to pass lower or higher voltages by moving the slider 32 on potentiometer or rheostat 33.

The output of threshold 9 is transmitted through circuit elements 10 and 11 to the integrator generally designated as 12.

The integrator comprises triodes 34 and 35 and related circuit elements. Some amplification takes place in integrator 12 and a gain control for such amplification is provided by slider 36 and potentiometer or rheostat 37. The rectification occurs because of the relationship of triode 35 with a large resistance 38 which may be about 1 megohm from which a slidable tap 39 leads to an integrating relatively high resistance 40 which may be about 20 megohms in combination with a relatively large condenser 41 which may be about 0.5 mfd.

The output of integrator 12 is conveyed by circuit element 13 to the voltage measuring element such as a vacuum tube voltmeter generally designated as 15. Such vacuum voltmeters are well known and many types may be employed. The one shown comprises triode 42, galvanometer 43 and related parts. The meter gain may be increased by moving slider 39 upwardly on resistance 38. The gain may be reduced by moving slider 44 to the right of resistance 45. The adjustments 44 and 45 govern the position on the output curve of the voltage characteristics of the triodes employed and is not ordinarily adjusted once the proper position is secured. The zero reading of the meter may be adjusted by moving slider 46 on resistor 47.

Wire 48 leads to a conventional power source generally designated as 49 by which ordinary 110 volt 60 cycle alternating house current 50 may be transformed by transformer 51 into the various voltages needed and rectified into the direct current by rectifier 52 and the alternating current ripple removed therefrom by the filter generally designated as 53.

*Operation*

If we consider the internal combustion engine (not shown) to be knocking every cycle with the same intensity on a certain fuel such that meter 15 reads "$D_1$" then upon change to a fuel of slightly higher octane value it will be found that the meter reads "$D_2$" which is less than "$D_1$." Denoting "$h_1$" and "$h_2$" as the average knock intensity at the pick-up 3 which produced "$D_1$" and "$D_2$" respectively; then as:

$b$ = amplification of (6) adjusted at 30
$c$ = threshold value of (9) adjusted at 32
$d$ = amplification of (12) adjusted at 36 then:

$$D_1 = (bh_1 - c)d$$
$$D_2 = (bh_2 - c)d$$

and the ratio will be:

$$\frac{D_1}{D_2} = \frac{bh_1 - c}{bh_2 - c}$$

It will be noticed that by varying $c$ the ratio can be varied from $$\frac{h_1}{h_2}$$

to infinity. By varying the parameters $b$, $c$ and $d$ any desired ratio of $D_1$ to $D_2$ is obtained which permits the detection and measurement of small differences in large quantities. This permits the use of reference fuels close in octane number while providing proper spread on the dial of meter 43 as required by the ASTM test procedure for the bouncing pin meter.

Pick-up 3 generates voltages substantially proportional to the intensity of detonation along with extraneous voltages caused by the clatter of closing valves, the rise in pressure of the gas above the piston on the compression stroke and further rise during normal non-detonating burning on the power stroke, stray voltages induced in the wires to pick-up 3 by ignition discharges and the like, and other noises. The extraneous voltages having frequencies of more than 2,000 cycles per second, which includes substantially all of the valve clatter, other motor noises, ignition induced discharges and a large amount of detonation frequencies (but not the detonation frequencies I measure which are below 2,000 cycles per second), are filtered out or greatly attenuated and greatly reduced in amplitude in filter 18 and the voltages below 2,000 cycles per second are amplified in amplifier 6; the extraneous voltages below 2,000 cycles per second (such as those caused by the rise in pressure due to compression or normal burning) and the remainder of all extraneous voltages above 2,000 cycles per second (which last mentioned were attenuated and reduced greatly in amplitude in filter 18) do not have sufficient amplitude to pass threshold 9; while detonation voltages having a frequency below 2,000 cycles per second and an amplitude below a predetermined value cannot pass through threshold 9 but those above the value predetermined by the threshold are integrated in integrator 12 and measured by voltage measuring means 15.

In the ASTM meter of the prior art (not shown) by adjustment of the tension of the lower spring it is possible to require a certain minimum detonation intensity or minimum rate of change of pressure before the contacts be closed. This essentially constitutes a threshold of detonation intensity. Element 9 in Figure 1 provides an electrical threshold which performs the same function on the output of the amplifier 6 and requires that the detonation intensity must be high enough to cause a certain minimum of voltage to appear at the input of element 9 in order to pass through. The energy which passes through element 9 is rectified and integrated in 12 and the integral is indicated by the vacuum tube voltmeter 15. The reading of the vacuum tube voltmeter 15 and the reading of the integrating elements associated with the bouncing pin have the same relation to each other thereby measurement of the peak rate of change of pressure is indicated by the vacuum tube voltmeter. The reason for desiring the electronic measurement instead of a bouncing pin is that the bouncing pin is so complicated in adjustment since the number of variables is large and the variables are not independent. One leaf spring is adjusted and that alters the tension on the other one, then the gap is varied, and that in turn reduces the tension of theh leaf spring. In the present inven- differences in large uantities. This permits the function on the out-put of the amplifier 6 and tension of the leaf spring. In the present invenpendently.

An electronic instrument has been disclosed above which does not require an expert operator as is necessary with the ASTM bouncing pin meter. No intricate mechanical adjustments are necessary in the present invention. More accurate and more sensitive results are obtained and yet these results have the same standard of rating as the bouncing pin meter so that results may be compared directly with those made by the ASTM bouncing pin meter.

It will be obvious therefore, that I have devised a method and means capable of carrying out all the objects of the invention in a suitable manner.

While in order to illustrate this invention certain preferred electrical circuits have been shown, it is believed obvious that numerous equivalent or alternate circuits and different elements of equivalent nature may be employed to obtain the same results without departing from the invention, and that the order of steps in the method may be varied or the substitution of equivalent steps may be made without departing from the invention, the scope of the invention being defined only by the following claims.

Having described my invention, I claim:

1. In a detonation meter the combination comprising means producing electrical voltages in response to pressure changes, a low pass filter tuned to pass selected frequency components of detonation, an amplifier, a threshold device comprising a vacuum tube having a grid, an adjustable negative grid bias resistor for said tube, said resistor being adjusted so that said threshold device amplifies only detonation generated voltages above a predetermined value, a rectifier, an integrating circuit and a vacuum tube voltmeter all connected in series in the exact order set forth in this claim.

2. In a detonation meter the combination comprising means producing electrical voltages of magnitude $h$ in response to pressure changes due to detonations, a low pass filter tuned to pass selected frequency components of detonation, a first amplifier having an adjustable amplification factor $b$, a biased amplifier comprising a vacuum tube having a grid, an adjustable negative grid bias factor $c$ and an adjustable amplification factor $d$, a rectifier, an integrating circuit, and a vacuum tube voltmeter all connected in series in the exact order set forth in this claim whereby if $D_1$ is the meter reading of detonation in testing one fuel and $D_2$ is the meter reading of detonation on testing a second fuel the ratio of $D_1$ to $D_2$ may be varied, by varying factors $b$, $c$ and $d$ according to the formula:

$$\frac{D_1}{D_2} = \frac{(bh_1 - c)d}{(bh_2 - c)d}$$

3. In a detonation meter, the combination comprising means for converting pressure variations into first alternating current electrical voltages, a low pass filter disposed so as to filter said first voltages of all components above a selected cut off range of 2,000 cycles per second to produce second voltages, a threshold device disposed so as to amplify all of said second voltages above a predetermined value and bias out all voltages below said value to produce third voltages, said value being chosen high enough to eliminate all but detonation induced voltages from said third voltages, said device comprising a vacuum tube having a plate, a grid, and a cathode circuit, and a variable resistance in the cathode circuit providing negative grid bias preventing flow of current from the plate to the cathode whenever the voltage of said grid is below said value, means disposed so as to rectify said third voltages, an integrating circuit disposed so as to receive said rectified third voltages and integrate them into fourth voltages and a voltmeter disposed so as to measure said fourth voltages.

4. In a detonation meter, the combination comprising means for converting pressure variations into first alternating current electrical voltages, a low pass filter disposed so as to filter said first voltages of all components above a selected cut off range of 2,000 cycles per second to produce second voltages, a threshold device comprising a vacuum tube having an anode, a cathode, and a control grid, an adjustable negative grid bias resistor for said tube, said resistor being adjusted so as to amplify all of said second voltages above a predetermined value and bias out all voltages below said value to produce third voltages, said value being chosen high enough to eliminate all but detonation induced voltages from said third voltages, means disposed so as to rectify said third voltages, an integrating circuit disposed so as to receive said rectified third voltages and integrate them into fourth voltages and a voltmeter disposed so as to measure said fourth voltages.

5. In a detonation meter, the combination comprising means for converting pressure variations into first alternating current electrical voltages, a low pass filter disposed so as to filter said first voltages of all components above a selected cut off range to produce second voltages, a threshold device comprising a vacuum tube having an anode, a cathode, and a control grid, an adjustable negative grid bias resistor for said tube, said resistor being adjusted so as to amplify all of said second voltages above a predetermined value and bias out all voltages below said value to produce third voltages, said value being chosen high enough to eliminate all but detonation induced voltages from said third voltages, means disposed so as to rectify said third voltages, an integrating circuit disposed so as to receive said rectified third voltages and integrate them into fourth voltages and a voltmeter disposed so as to measure said fourth voltages.

DESLONDE R. DE BOISBLANC.

REFERENCES CITED

The following references are of record in the file of this patent:

UNITED STATES PATENTS

| Number | Name | Date |
|---|---|---|
| 2,139,474 | Shepard | Dec. 6, 1938 |
| 2,275,675 | Draper et al. | Mar. 10, 1942 |
| 2,337,522 | Eldredge | Dec. 21, 1943 |
| 2,340,714 | Traver et al. | Feb. 1, 1944 |
| 2,416,614 | Crosley et al. | Feb. 25, 1947 |

Certificate of Correction

Patent No. 2,534,005                                                              December 12, 1950

DESLONDE R. DE BOISBLANC

It is hereby certified that error appears in the printed specification of the above numbered patent requiring correction as follows:

Column 4, line 44, for "voltaves" read *voltages*; column 5, line 4, for "theh" read *the*; same line 4, beginning with the words "In the present" strike out all to and including "pendently." in line 8, same column, and insert instead *In the present invention each element b, c and d can be varied independently.*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*